(12) United States Patent
Gray et al.

(10) Patent No.: US 7,728,765 B1
(45) Date of Patent: Jun. 1, 2010

(54) METHOD AND APPARATUS FOR CLUTTER FILTERING STAGGERED PULSE REPETITION TIME SIGNALS

(75) Inventors: Grant Gray, Marble Canyon, AZ (US); John Hubbert, Fort Collins, CO (US); Gregory Meymaris, Boulder, CO (US)

(73) Assignee: University Corporation of Atmospheric Research, Boulder, CO (US)

( * ) Notice: Subject to any disclaimer, the term of this patent is extended or adjusted under 35 U.S.C. 154(b) by 0 days.

(21) Appl. No.: 12/436,945

(22) Filed: May 7, 2009

(51) Int. Cl.
G01S 7/292 (2006.01)
G01S 13/22 (2006.01)
G01S 7/02 (2006.01)
G01S 13/00 (2006.01)

(52) U.S. Cl. ............... 342/159; 342/89; 342/118; 342/134; 342/135; 342/137; 342/175; 342/195

(58) Field of Classification Search ........... 342/89–103, 342/118, 134–145, 159–164, 175, 192–197, 342/176
See application file for complete search history.

(56) References Cited

U.S. PATENT DOCUMENTS

| | | | | |
|---|---|---|---|---|
| 3,480,953 A | * | 11/1969 | Shreve | 342/163 |
| 3,631,490 A | * | 12/1971 | Palmieri | 342/160 |
| 3,727,224 A | * | 4/1973 | Webb | 342/161 |
| 3,950,749 A | * | 4/1976 | Wiedemann | 342/137 |
| 4,040,057 A | * | 8/1977 | Cross et al. | 342/159 |
| 4,137,532 A | * | 1/1979 | Taylor et al. | 342/93 |
| 4,730,189 A | * | 3/1988 | Siegel et al. | 342/137 |
| 4,890,113 A | * | 12/1989 | Jacomini | 342/163 |

OTHER PUBLICATIONS

Doviak, R.J. and D.S. Zrnic: 1993, Doppler Radar and Weather Observations, Academic Press, San Diego, Califoma, 2$^{nd}$ edition.

Frehlich, R., 2000: Simulation of coherent doppler lidar performance for space-based platforms, Journal of Applied Meteorology, 39, 245-262.

Frehlich, R., L.B. Cornman, and R. Sharman, 2001: Simulation of three-dimensional turbulant velocity fields. Journal of Applied Metorology, 40 246-258.

Frehlich, R. and M.J. Yadlowsky, 1994: Performance of mean-frequency estimators for doppler radar and lidar. Journal of Atmospheric and Oceanic Technology, 11, 1217-1230, corrigenda, 12, 445-446.

Sachidananda, M. and D. Zrnic, 2000: Clutter filtering and Spectral Moment Estimation for Doppler Weather Radars Using Staggered Pulse Repetition Time (PRT). Journal of Atmospheric and Oceanic Technology, 17, 323-331.

(Continued)

Primary Examiner—Bernarr E Gregory
(74) Attorney, Agent, or Firm—The Ollila Law Group LLC

(57) ABSTRACT

A method for clutter filtering staggered pulse repetition time data signals is provided. The method comprises the steps of receiving a plurality of staggered pulse repetition time data signals. The data signals may comprise one or more desired signals and one or more clutter signals. The method further comprises separating the staggered pulse repetition time data signals into a first separated data sequence and a second separated data sequence. The first and second separated data sequences comprise equally spaced data samples. The method also comprises the step of filtering the one or more clutter signals from the first and second separated data sequences.

18 Claims, 7 Drawing Sheets

OTHER PUBLICATIONS

Sachidananda, M. and D.Zrnic, 2002: An Improved Cultter Filtering and Spectral Moment Estimation Algorithm for Staggered PRT Sequences. Journal of Atmospheric and Oceanic Technology, 19, 2009-2019.

Sachidananda, M., D. S. Zrnic, and R.J. Doviak, 1999: Signal design and processing techniques for WSR-88D ambiguity resolution. part-3. Technical report, National Severe Storms Laboratory.

Siggia, A. and J.R. Passarelli: 2004, Gaussian model adaptive processing (gmap) for improved ground clutter cancellation and moment calculation. Proceedings of Third European Conference on Radar in Meteorology and Hydrology, ERAD, Visby, Gotland, Sweden, 67-73.

Torres, S., M. Sachidananda, and D.S. Zrnic, 2004: Signal design and processing techniques for WSR-88D ambiguity resolution: Phase coding and staggered PRT data collection, implementation, and clutter filtering. part-8. Technical report, National Severe Storms Laboratory.

Zrnic, D.S., 1975: Simulation of weatherlike doppler spectra and signals, Journal of Applied Meteorology, 14, 619-620.

Zrnic, D. S. and P. Mahapatra, 1985: Two Methods of Amibiguity Resolution in Pulse Doppler Weather Radars. Aerospace and Electronic Systems, IEEE Transactions on, AES-21, 470-483.

M. Sachidananda and Dusan S. Zrnic, Systematic Phase Codes for Resolving Range Overlaid Signals in a Doppler Weather Radar, Journal of Atmospheric and Oceanic Technology, vol. 16, Oct. 1999.

J.C. Hubbert, M. Dixon and S. Ellis, Weather Radar Ground Clutter, Part II: Real Time Identification and Filtering.

\* cited by examiner

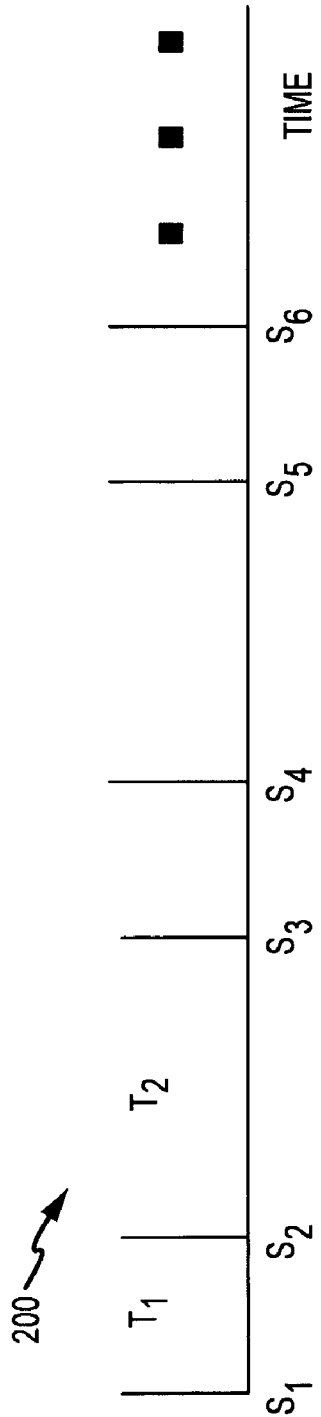
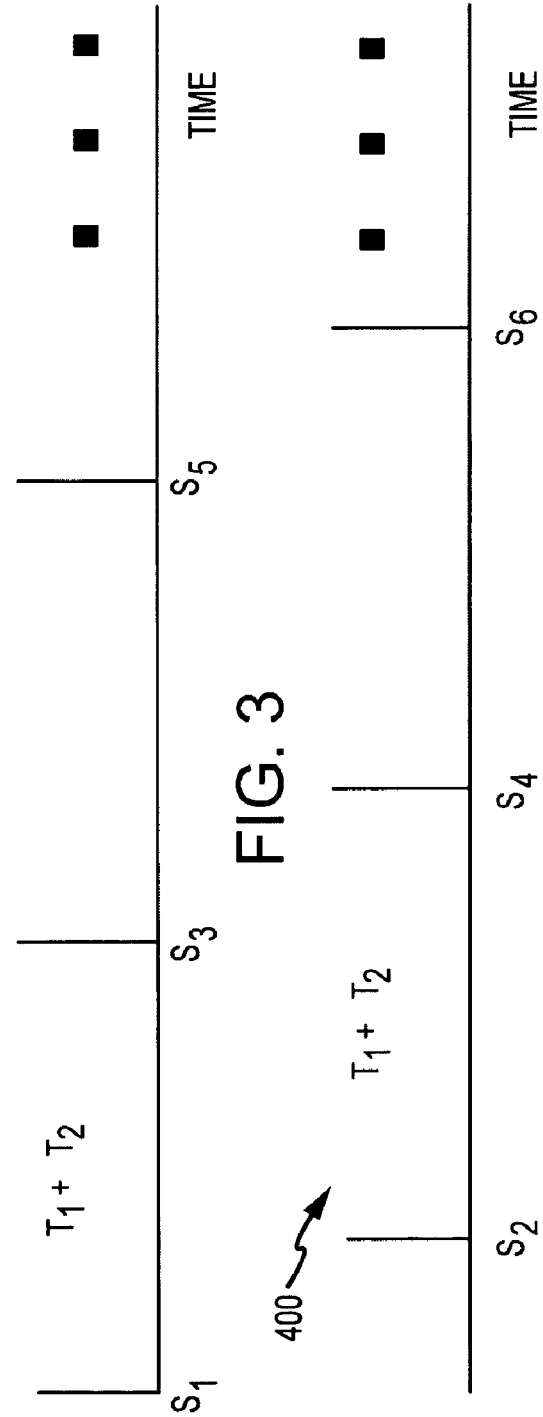
FIG. 2
FIG. 3
FIG. 4

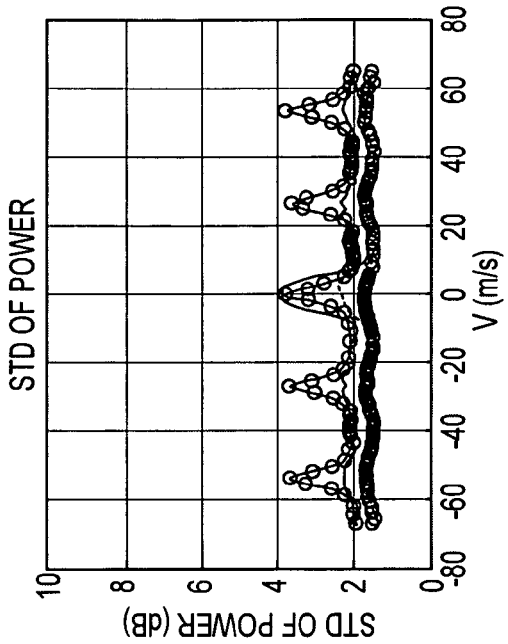
FIG. 9a
FIG. 9b
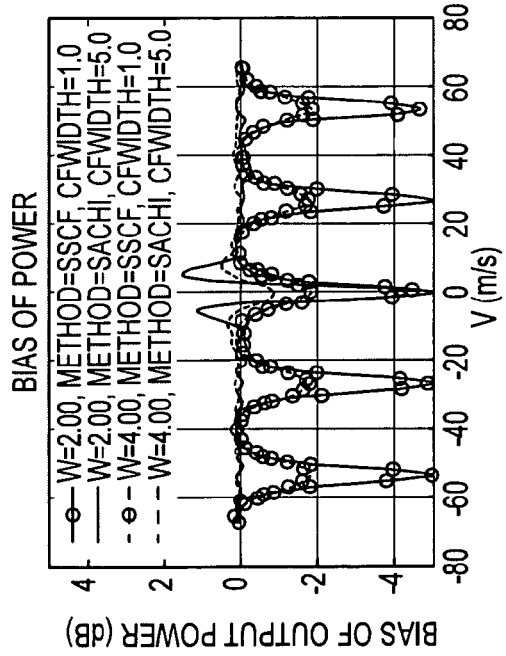
FIG. 9c
FIG. 9d

METHOD AND APPARATUS FOR CLUTTER FILTERING STAGGERED PULSE REPETITION TIME SIGNALS

GOVERNMENT LICENSE RIGHTS

This invention was made with Government support under ATM-0301213 awarded by the National Science Foundation. The Government has certain rights in this invention.

TECHNICAL FIELD

The present invention relates to signal filtering. More specifically, the present invention relates to a method and apparatus for clutter filtering staggered pulse repetition time signals.

BACKGROUND OF THE INVENTION

Doppler weather radar have experienced great success in locating and calculating precipitation, wind, positions of current weather systems, etc. A Doppler radar transmits a plurality of directional pulses toward an area of interest. The pulses bounce off from various particles, such as precipitation and are then received by a radar receiver as echo pulses. These return echoes are studied based on their intensity, received time, and phase angle relative to the transmitted signal. Generally, there is a compromise between maximizing the unambiguous Doppler velocity (maximum detectable velocity of the target before folding of the signal occurs) and the unambiguous range (maximum distance from the radar to the target before folding of the signal occurs). This is because for a pulse repetition time (PRT) of T, the unambiguous velocity is given by $\lambda/(4T)$, where $\lambda$ is the pulse wavelength; whereas the unambiguous range is given by $cT/2$, where c is the speed of light. The pulse repetition time is the time between transmitted pulses. It is generally desired to have both quantities to be as large as possible. Because the PRT is in the bottom of the equation for the unambiguous velocity, but in the top of the equation for the unambiguous range, there is necessarily a tradeoff between the two.

One method to at least partially overcome this problem is to stagger the spacing of the transmitted pulses. This so called staggered PRT method typically utilizes at least two different alternating pulse spacings $T_1$ and $T_2$. In the case where $T_1$ and $T_2$ have a common interval, i.e. if $T_1/T_2=n/m$ where n and m are positive integers with no common factors, the common interval is $C=T_1/n=T_2/m$, then the unambiguous velocity is given as $\lambda/(4C)$. The unambiguous range is given by $cT_2/2$, where c is the speed of light in $ms^{-1}$. It is generally understood that the standard error in the velocity estimate increases as the ratio of $T_1/T_2$ approaches unity. Therefore, the ratio is generally chosen as 2/3, however, other ratios are possible, and the particular ratio used should not limit the scope of the invention.

Although the staggered PRT approach overcomes some of the problems experienced by the conflict between the unambiguous velocity and the unambiguous range, the approach can create problems in processing the signals received by the radar. This is particularly true when attempting to suppress the clutter echo in the signal. Signal clutter is produced by echo signals reflected from targets that are not of interest. For example, in weather radar systems, signals reflected off the ground would be an example of clutter. In uniform pulse repetition time systems, clutter filtering can be accomplished according to well known techniques using time domain or spectral domain filtering; almost all prior art techniques rely on uniform pulse repetition times. However, in staggered PRT signal processing, the time series are not uniformly spaced, because of the different spacing between $T_1$ and $T_2$, and thus the aforementioned techniques do not immediately apply.

Prior art approaches to solving this equi-spacing problems include an approach by Sachidananda and Zrnić, (Sachidananda, M. and D. Zrnić, 2002: An Improved Clutter Filtering and Spectral Moment Estimation Algorithm for Staggered PRT Sequences. *Journal of Atmospheric and Oceanic Technology,* 19, 2009-2019), which is hereby incorporated by reference. This prior art approach introduced a staggered PRT clutter filtering algorithm based on the interpolation of the time-series to equi-spaced data samples. This prior art approach interleaved zeros into the time-series to create equi-spaced time-series data samples. The interpolated time-series is then transformed with a discrete Fourier Transform (DFT). The resulting spectrum contains five modulated "replicas" of the intrinsic underlying spectrum. Complicated matrix mathematics must then be used to filter the spectra and estimate the power, mean velocity, and spectrum width. These complicated calculations result in requiring more sophisticated processing equipment as well as increased processing time.

Therefore, there exists a need for a method to remove clutter from a staggered PRT signal that is easy to implement and can be utilized with existing filters. The present invention solves this and other problems and an advance in the art is achieved.

SUMMARY OF THE INVENTION

A method for clutter filtering staggered pulse repetition time data signals is provided according to an embodiment of the invention. The method comprises the steps of receiving a plurality of staggered pulse repetition time data signals. The data signals comprise one or more desired signals and one or more clutter signals. The method also comprises the step of separating the staggered pulse repetition time data signals into a first separated data sequence and a second separated data sequence. The first and second separated data sequences comprise equally spaced data samples. The method also comprises the step of filtering the one or more clutter signals from the first and second separated data sequences.

A signal processing system is provided according to an embodiment of the invention. The signal processing system comprises a signal processor. The signal processor is configured to receive a plurality of staggered pulse repetition time data signals. The data signals comprise one or more desired signals and one or more clutter signals. The signal processor is also configured to separate the staggered pulse repetition time data signals into a first separated data sequence and a second separated data sequence. The first and second separated data sequences comprise equally spaced data samples. The signal processor is also configured to filter the one or more clutter signals from the first and second separated data sequences.

ASPECTS

Preferably, the method further comprises the step of recombining the filtered first and second separated data sequences to provide a filtered staggered pulse repetition time data sequence.

Preferably, the method further comprises the step of generating a representation of the filtered staggered pulse repetition time data sequence.

Preferably, the method further comprises the step of storing the filtered staggered pulse repetition time data sequence in a storage system of a signal processor.

Preferably, the step of filtering the one or more clutter signals comprises using a digital filter.

Preferably, the step of filtering the one or more clutter signals comprises using a Gaussian Model Adaptive Processing clutter filter.

Preferably, the spacing between data samples comprises a first pulse repetition time pulse spacing $T_1$ plus a second pulse repetition time pulse spacing $T_2$.

Preferably, the method further comprises the step of transforming the first and second separated data sequence from a time domain to a frequency domain prior to the step of filtering.

Preferably, the step of filtering the one or more clutter signals from the first and second separated data sequences comprises first determining which data signals comprise clutter signals and selectively filtering only the data signals that comprise clutter signals.

Preferably, the signal processor is further configured to recombine the filtered first and second separated data sequences to provide a filtered staggered pulse repetition time data sequence.

Preferably, the radar signal processing system further comprises an interface configured to generate a representation of the filtered staggered pulse repetition time data sequence.

Preferably, the radar signal processing system further comprises a storage system configured to store the filtered staggered pulse repetition time data sequence.

Preferably, the one or more clutter signals are filtered using a digital filter in the signal processor.

Preferably, the one or more clutter signals are filtered using a Gaussian Model Adaptive Processing clutter filter in the signal processor.

Preferably, the spacing between data samples comprises a first pulse repetition time pulse spacing $T_1$ plus a second pulse repetition time pulse spacing $T_2$.

Preferably, the signal processor is further configured to transform the first and second separated data sequences from a time domain to a frequency domain prior to filtering.

Preferably, the signal processor is further configured to determine which data signals comprise clutter signals and selectively filter only the data signals that comprise clutter signals.

BRIEF DESCRIPTION OF THE DRAWINGS

FIG. 2 shows a received data sequence according to an embodiment of the invention.

FIG. 3 shows a first separated data sequence according to an embodiment of the invention.

FIG. 4 shows a second separated data sequence according to an embodiment of the invention.

FIGS. 9a-9d shows the clutter suppression capabilities of the present invention compared to a prior art approach.

DETAILED DESCRIPTION OF THE INVENTION

FIGS. 1-9d and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
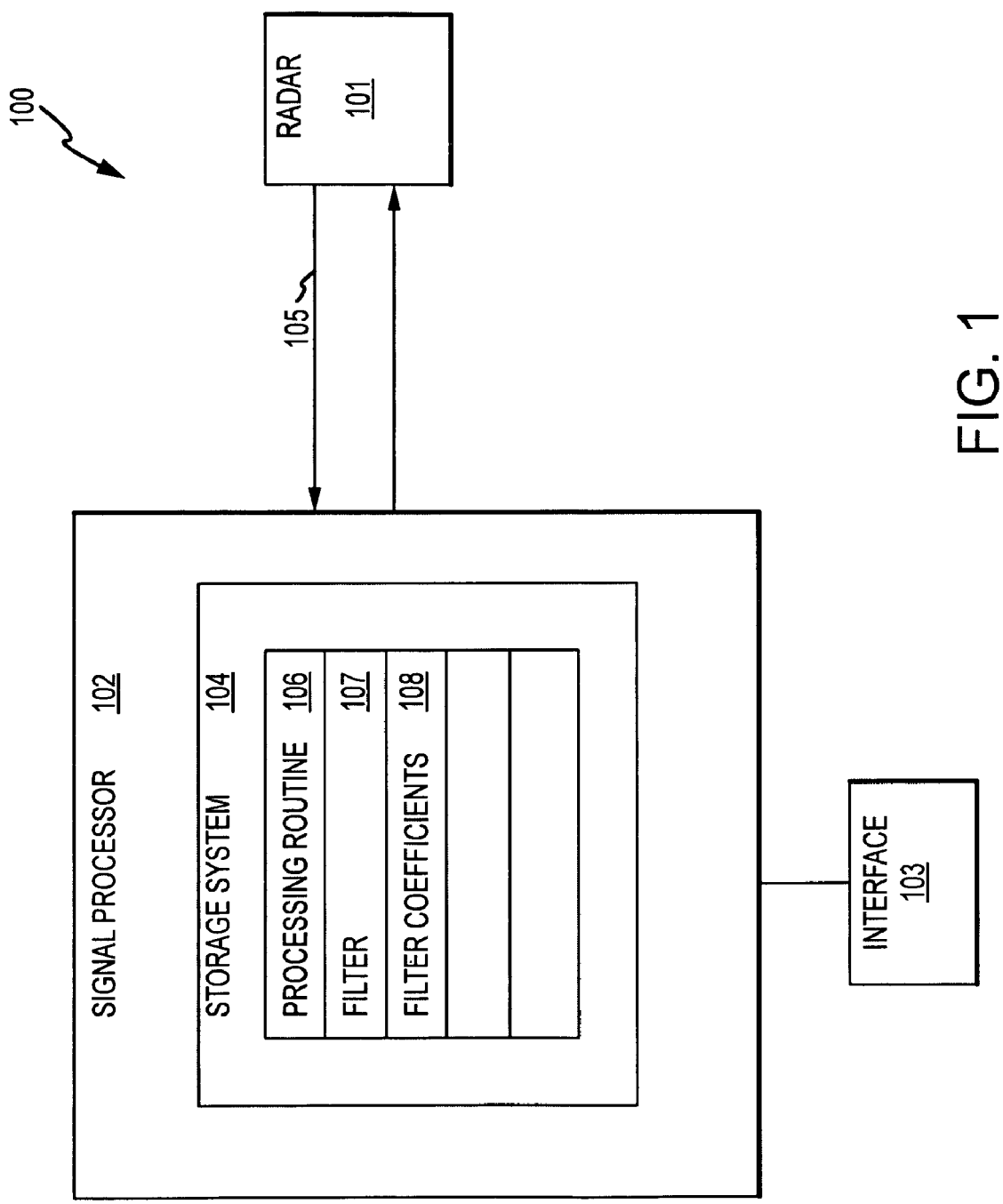
FIG. 1 shows a signal processing system according to an embodiment of the invention.

FIG. 1 shows a block diagram of a signal processing system 100 according to an embodiment of the invention. In some embodiments, the signal processing system 100 can include a radar 101, a signal processor 102, and an interface 103. The signal processing system 100 can receive radar signals from the radar 101. It should be appreciated however, that the present invention is not limited to radar signal processing, but rather, the signals may be received from a variety of sources and a radar is described as merely one embodiment of the invention. If the signals are received from a radar, the radar 101 may comprise a Doppler radar, for example. The radar 101 may include a transmitter for transmitting pulses towards a specified volume of the surrounding atmosphere and a receiver for receiving echo pulses reflected off from various targets. The processing system 100 can process the radar signals in order to obtain one or more measurements, such as a Doppler velocity, spectrum width, precipitation type and/or quantity, as well as other atmospheric information. The data samples may represent the combination of individual signals coming from various targets and non-targets in the pulse volume. The radar processing system 100 can also include a communication system 105 to provide communication between the radar 101 and the signal processor 102. The communication system may comprise wire leads or a wireless technology. The particular communication system 105 should not limit the scope of the present invention.

The signal processor 102 may receive radar signals as well as send information to the radar 101 such as a desired pulse, for example. A data sample of the received radar signals may comprise a plurality of echo pulses and a plurality of clutter pulses that are received by the radar in response to the transmitted pulses. The signal processor 103 can comprise a general purpose computer, a microprocessing system, a logic circuit, or some other general purpose or customized processing device. The signal processor 102 can be distributed among multiple processing devices. The signal processor 102 can include any manner of integral or independent electronic storage medium, such as the storage system 104. The signal processor 102 may be utilized for clutter filtering of the signal received from the radar 101.

The storage system 104 can store parameters and data, software routines, constant values, and variable values. In addition, the storage system 104 can store one or more filters 107 that are employed by a processing routine, such as the processing routine 500, wherein a filter 107 includes a series of coefficients 108. The number of filter coefficients 108 may depend on various factors. For example, the number of filter coefficients 108 can be chosen according to the frequency span of the input waveform, the frequency span of the filtered result (i.e., the width of the filter transfer function), the desired shape of the filter transfer function, the sharpness or roll-off of the transfer function, etc. The filter 107 may comprise a digital filter or more than one digital filter, for example. The digital filters can comprise any manner of digital filters, including finite impulse response (FIR) and infinite impulse response (IIR) filters, spectral domain filters (based on Discrete Fourier Transform (DFT)), etc. The digital filters can perform filtering, phase-shifting, and windowing functions, among other things. Other filter types and filter uses are contemplated and are within the scope of the description and claims.

A digital filter can be used to eliminate frequencies outside of a frequency band of interest, such as through the use of any variety of low pass, bandpass, or high pass filter.

A digital filter can be used for decimation, wherein some samples are eliminated in order to reduce the sampling rate. Decimation can be used to vary the number of frequency bands to be processed, for example.

A digital filter can be used for windowing, wherein frequencies outside of a window are eliminated. Windowing can be performed after a processing stage, such as to cut off tails generated by Fourier processing.

In some embodiments, a measurement can be derived from a phase-shifting of one or more received signals. This advantageously reduces the required processing time.

A digital filter 107 can include a set or chain of coefficients 108 that correspond to and are applied against the digitally sampled waveform of interest. The filter 107 is designed based on the desired output to be obtained from the input waveform. According to an embodiment of the invention, when the digital input waveform is filtered using the coefficients 108 of the digital filter 107, the filtering process passes at least a portion of the frequencies or frequency bands of interest, while rejecting non-desired frequencies or frequency bands.

According to an embodiment of the invention, the radar processing system 100 is configured to operate using a staggered PRT sequence. According to one embodiment, the signal processor 102 may be configured to generate the associated staggered PRT sequence that the radar 101 transmits. According to another embodiment, the radar 101 may include its own signal generator or receive instructions from another processing system.

FIG. 2 shows an example of a staggered (PRT) signal data sequence 200 according to an embodiment of the invention. The staggered PRT data sequence 200 may be received by the signal processor 102 from the Doppler radar 101, for example. As shown, the staggered PRT sequence 200 comprises two periods or pulse spacings, $T_1$ and $T_2$. According to an embodiment of the invention, the ratio of $T_1/T_2=2/3$; however, it should be appreciated that any ratio may be utilized and the particular ratio used should not limit the scope of the present invention. It should be appreciated that while $T_1$ is described as being shorter than $T_2$, the reverse could be true, i.e., $T_2$ being shorter than $T_1$. The staggered PRT sequence 200 also shows a plurality of time-series data samples $s_1, s_2 \ldots, s_M$ (where M is the total number of data samples). The plurality of time-series samples correspond to signals received from the radar 101 in response to a transmitted pulse. For example, the signals may correspond to data samples such as the following:

| $T_1$ | $T_2$ | $T_1$ | $T_2$ | $T_1$ | $T_2$ | $T_1$ | $T_2$ |
|---|---|---|---|---|---|---|---|
| I | I | I | I | I | I | I | I |
| iiiii | iiiii | iiiii | iiiii | iiiii | iiiii | iiiii | iiiii |
| ($s_1$) | ($s_2$) | ($s_3$) | ($s_4$) | ($s_5$) | ($s_6$) | ($s_7$) | ($s_8$) |

Where I=transmitted pulses and i=received signals. As can be seen, the time between consecutive data samples are not equally spaced. The pulse spacing $T_1$ is much shorter than the pulse spacing $T_2$. Therefore, the spacing between data samples $s_1$ and $s_2$ is much shorter than the spacing between samples $s_2$ and $s_3$. Because of this unequal spacing, traditional filtering techniques such as time domain BR filtering or spectral filtering can not be used with the staggered PRT data sequence 200.

In order to overcome the clutter filtering problems of the prior art, the present invention separates the signal sequence 200, such that the separated sequences comprise equal spacing between data samples. This is shown in FIGS. 3 & 4.

FIG. 3 shows a first separated data sequence 300 while FIG. 4 shows a second separated data sequence 400. As shown, the first separated data sequence 300 comprises the odd numbered data samples, i.e., samples $s_1, s_3, s_5 \ldots$. As can be seen, the odd numbered data samples comprise data samples that are generated in response to pulses having a PRT spacing of $T_1$. As a result, the spacing between the first separated data sequence 300 data samples are equally spaced, which is in contrast to the data sequence 200 of FIG. 2. Similarly, the second data sequence 400 comprises the even numbered data samples, i.e., samples $s_2, s_4, s_6 \ldots$. As can be seen, the even numbered data samples comprise data samples that are generated in response to pulses having a PRT spacing of $T_2$. As a result, the samples of the second data sequence 400 are also equally spaced. As can be appreciated both the first and second separated data sequences comprise a spacing between data samples substantially equal to $T_1+T_2$. As a result of the equal spacing between the first and second data sequences, both data sequences can be clutter filtered using standard clutter filtering techniques as is generally known in the art for equally spaced data samples, such as for data samples received during single PRT pulse operating modes of the prior art.

With equal spacing between the first and second data sequences, a number of advantages can be realized. As mentioned above, both data sequences can be clutter filtered using standard clutter filtering techniques. In addition, the separated data sequences can be phase coded according to known techniques. One known technique is described by Sachidananda and Zrnic, for example (Sachidananda and Zrnic (1999): Systematic Phase Codes for Resolving Range Overlaid Signals in a Doppler Weather Radar. *Journal of Atmospheric and Oceanic Technology*, Volume 16, Issue 10 (October 1999) p. 1351-1363). The advantage to phase coding the separated data sequences is that the unambiguous range of the radar data can be increased.

Another advantage to the separated data sequences is that according to an embodiment of the invention, the Clutter Mitigation Decision (CMD) algorithm can be implemented. The CMD algorithm is described in "Weather Radar Ground Clutter, Part II: Real Time Identification and Filtering", by J. Hubbert, M. Dixon, and S. Ellis, which is in press at the time of filing this application. This CMD algorithm determines which data signals comprise clutter signals and directs the clutter filter to only be applied to those data signals that actually comprise clutter signals and thereby not clutter filtering zero velocity weather echoes, which are desired signals. Advantageously, by implementing the CMD algorithm with the present invention the number of zero velocity weather echoes filtered from the separated data sequences can be substantially reduced.

Figure 5:
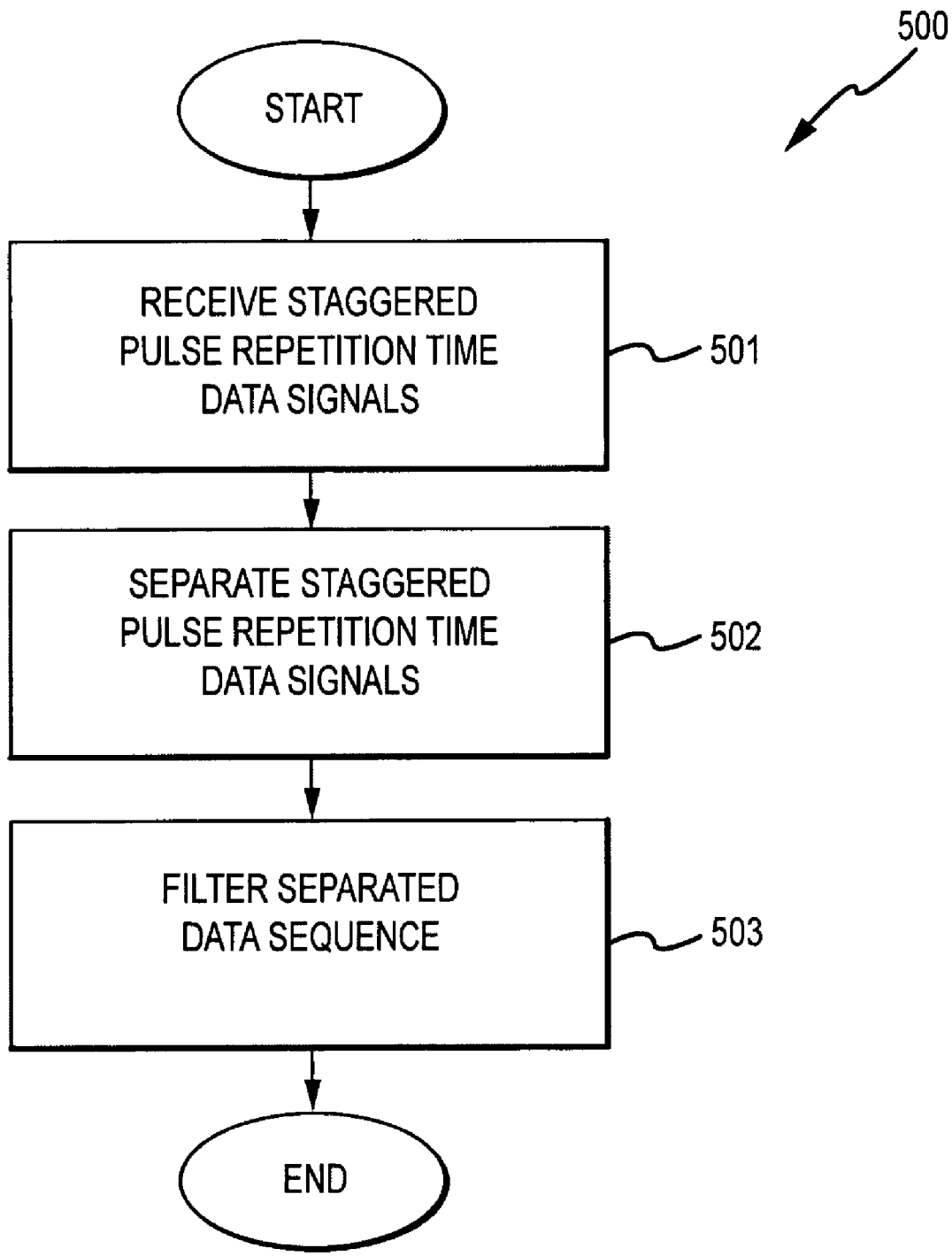
FIG. 5 shows a processing routine according to an embodiment of the invention.

FIG. 5 shows a processing routine 500 according to an embodiment of the invention. The processing routine 500 can be performed by the signal processor 102 in order to clutter filter a received signal. According to an embodiment of the invention, the processing routine 500 begins in step 501 where a plurality of staggered pulse repetition time data signals are received. The data signals may be received from a radar, or from some other source. The staggered pulse repetition time data signals may correspond to a staggered PRT data sequence, such as the data sequence 200, for example. The staggered PRT data signals may comprise one or more desired signals, such as one or more desired echo signals received from a radar. Furthermore, the staggered pulse repetition time data signals may comprise one or more clutter signals. The staggered pulse repetition time data signals may be stored in the storage system 104 of the processing system 102, for example. According to an embodiment of the invention, the staggered pulse repetition time data signals are received in response to pulses with alternating spacings of $T_1$ and $T_2$. Therefore, the staggered pulse repetition time data signals my not comprise equal spacing between data samples. As a result, the staggered pulse repetition time data signals may not be able to be filtered according to traditional digital filtering methods.

In step 502 of the processing routine 500, the staggered pulse repetition time data signals are separated. According to an embodiment of the invention, the staggered pulse repetition time data signals are separated into a first separated data sequence and a second separated data sequence. It should be understood that there may be more than two separated data sequences and the particular number of separate data sequences will depend on the particular number of different pulse repetition times utilized. Two separated data sequences are illustrated merely as an example because generally, there are two pulse repetition time spacings $T_1$ and $T_2$ used. According to an embodiment of the invention, the separated data sequences comprise equally spaced data samples. According to an embodiment of the invention, the separated data samples may be equally spaced with the spacing between data samples being substantially equal to $T_1+T_2$. According to an embodiment of the invention, the spacing between data samples in the first separated data sequence is substantially the same as the spacing between the second separated data sequence. According to an embodiment of the invention, the first separated data sequence may comprise the odd numbered data samples while the second separated data sequence may comprise the even numbered data samples. However, it should be appreciated that the staggered PRT data signals may be separated according to another method.

In step 503, the first and second separated data sequences are filtered. The filtering may comprise clutter filtering the first and second separated data sequences. The clutter filtering can be performed according to known methods using typical filters because the spacing between the data samples is substantially equal, i.e., $T_1+T_2$. Therefore, the separated data sequences do not have to be interpolated as in the prior art. As mentioned above, in some embodiments, the CMD algorithm may be performed prior to the filtering step in order to reduce the amount of zero velocity weather echoes filtered. Furthermore, the filtering can be performed in the time domain or the frequency domain. According to an embodiment of the invention, the first and second separated data sequences may be windowed using a von Hann window function. Furthermore, the first and second data sequences may be transformed to a frequency domain prior to filtering, if a frequency domain filter is utilized. The transformation may be performed using a Discrete Fourier Transform, for example. If a time-domain filter is utilized, then no transformation is required.

Once the first and second separated data sequences have been clutter filtered, the signal processor 102 may recombine the separated data sequences to provide a filtered staggered pulse repetition time data sequence. It should be appreciated that the newly combined filtered staggered pulse repetition time data sequence did not require interpolation as in the prior art. Furthermore, complex matrix calculations are not necessary. Once the first and second separated data sequences are recombined, a representation of the filtered staggered pulse repetition time data sequence may be generated. The generation may comprise displaying the filtered staggered pulse repetition time data sequence on the interface 103, for example, or may comprise some other form of representation. The filtered staggered pulse repetition time data sequence may be stored in the storage system 104 of the signal processor 102 for further processing, for example.

In order to better demonstrate the practicality of utilizing the present invention, the inventors of the present invention compared the current invention to the prior art technique described by Sachidananda and Zrnić (SACHI). In the comparison, $T_1=1$ ms and $T_2=1.5$ ms so that $T_1+T_2=2.5$ ms. In order to evaluate and compare different clutter filters, random complex time-series data were generated for various operational settings (number of pulses per time-series (M) and pulse repetition time (PRT), and clutter filter settings (notch width), as well as various weather/clutter conditions (true weather mean velocity, spectrum width, signal-to-noise ratio (SNR), clutter-to-signal ratios (CSR)). An I&Q simulation technique was used based on a prior art method, which is generally known in the art. In order to simulate staggered PRT sequences, the I&Q simulator is used to generate evenly spaced data at the higher "common" PRT C (which is, for the 2/3 case, $\frac{1}{2}T_1$), and then the data is down-sampled.

The simulation parameter settings used in the comparison are as follows: 1000 time-series for each scenario, wavelength (λ) of 10.5 cm, noise power of −80 dB, clutter spectrum width 0.28 m/s, $T_1$ of 785 µs, and 1000 µs, M of 32 and 64, mean velocities ranging across the Nyquist interval, spectrum width (weather) of 2 and 4 m/s, SNR of 10 dB and 20 dB, and CSR of −40 dB to 50 dB.

Each time-series was processed using both the SACHI method as well as the method according to the current invention. The two spectra were then filtered using the Gaussian Model Adaptive Processing (GMAP) clutter filter as is generally known in the art. It should be appreciated that other clutter filters may be utilized and the use of GMAP should not in any way limit the scope of the present invention. If GMAP determined that a clutter echo exists then GMAP not only attempts to remove the clutter power, but it also attempts to reconstruct the weather by assuming a Gaussian shape. Normally, this is useful, but for staggered PRT data it would normally be necessary to also reconstruct the phases as well. For the analysis described, the spectral bins identified by GMAP as containing clutter were simply set to zero, i.e., GMAP is used to identify the width for a notch filter. It should be appreciated that other methodologies for removing and/or reconstructing the spectra may be utilized and the method described should not in any way limit the scope of the present invention. An inverse FFT was then applied to each spectrum, and the time-series were recombined. The power, mean velocity, and spectrum width could then be calculated using the standard techniques known in the art.

Figure 6:
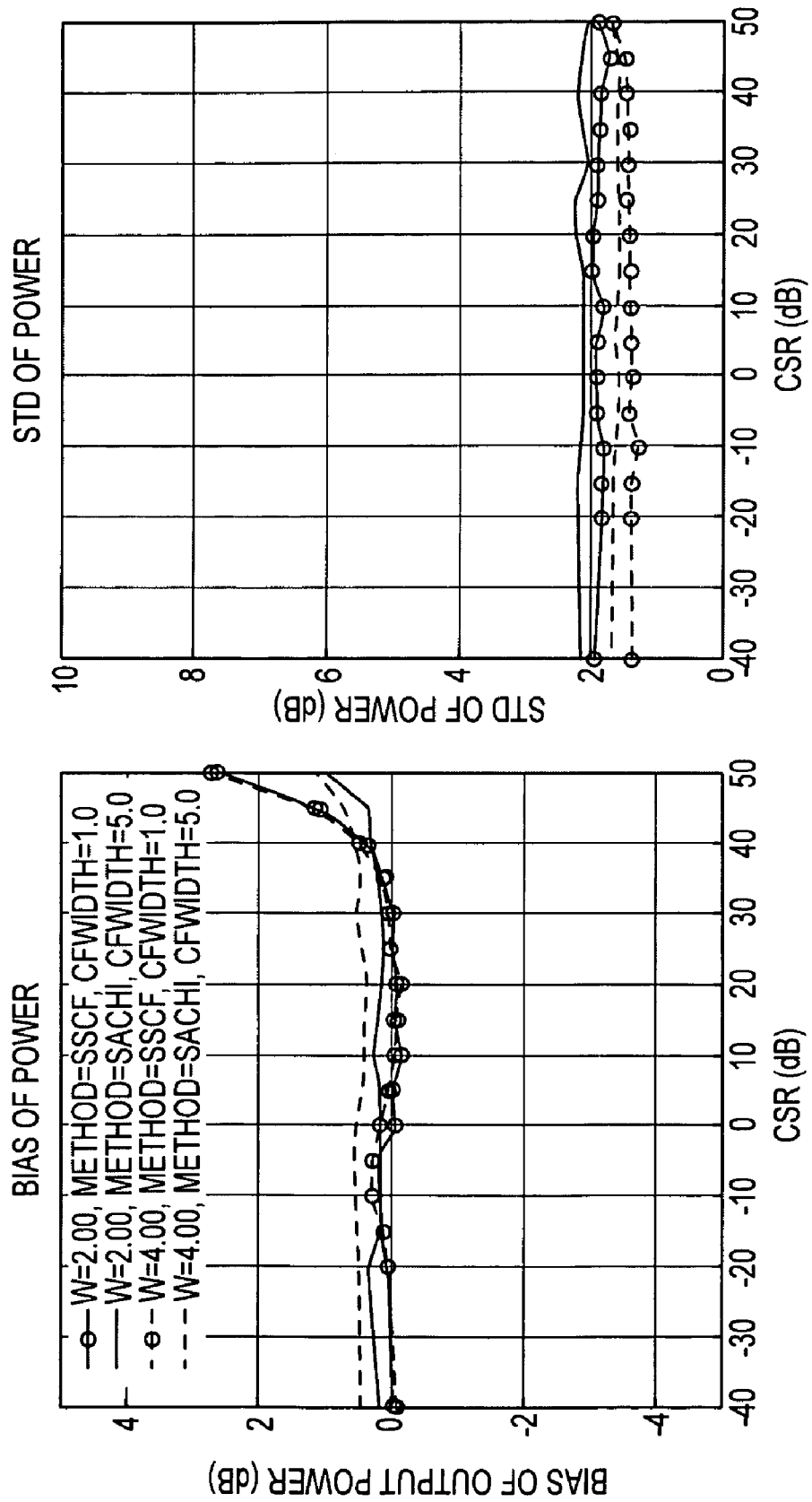
FIG. 6 shows the clutter suppression capabilities of the present invention compared to a prior art approach.
Figure 7:
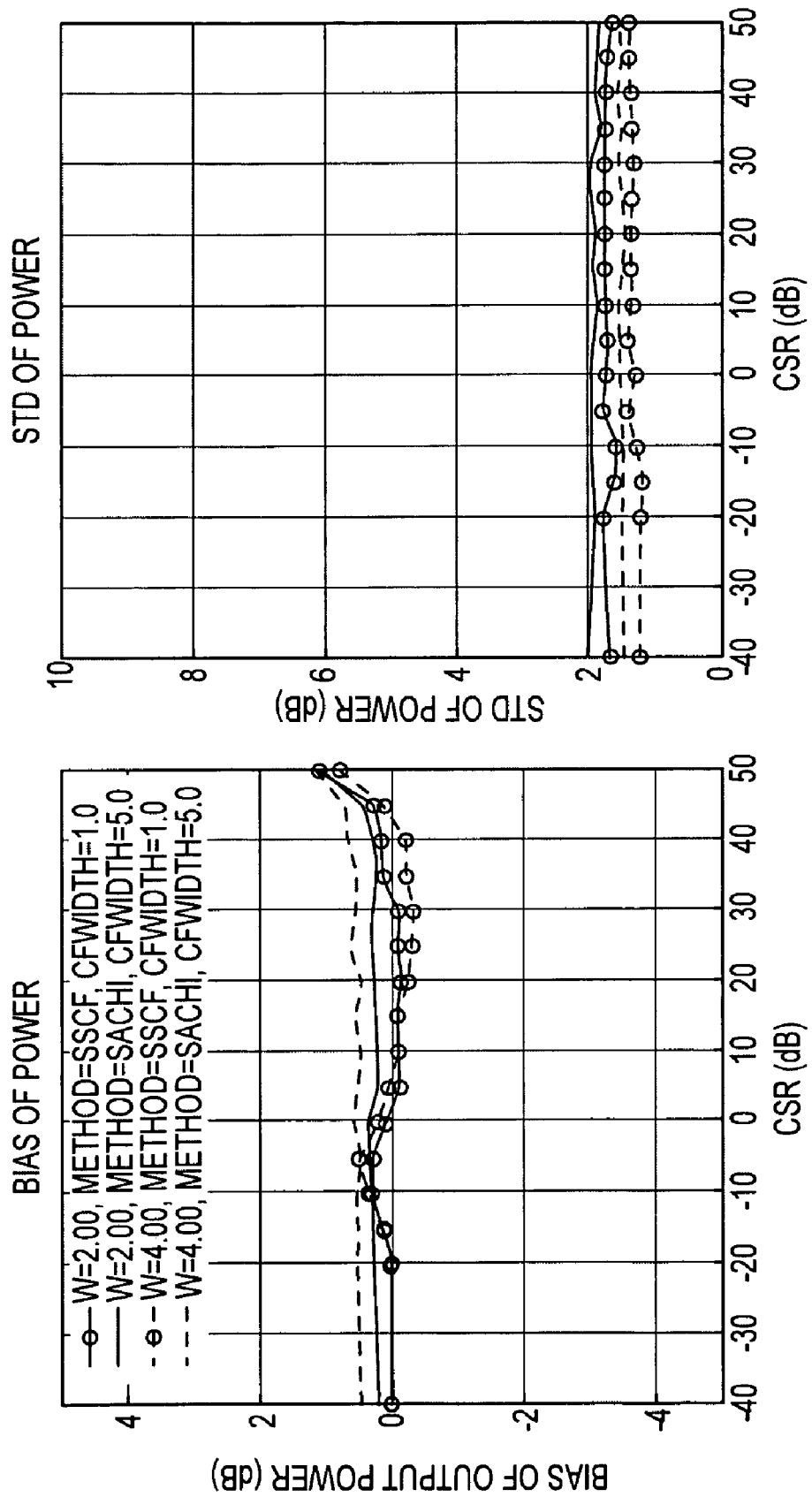
FIG. 7 shows the clutter suppression capabilities of the present invention compared to a prior art approach.
Figure 8:
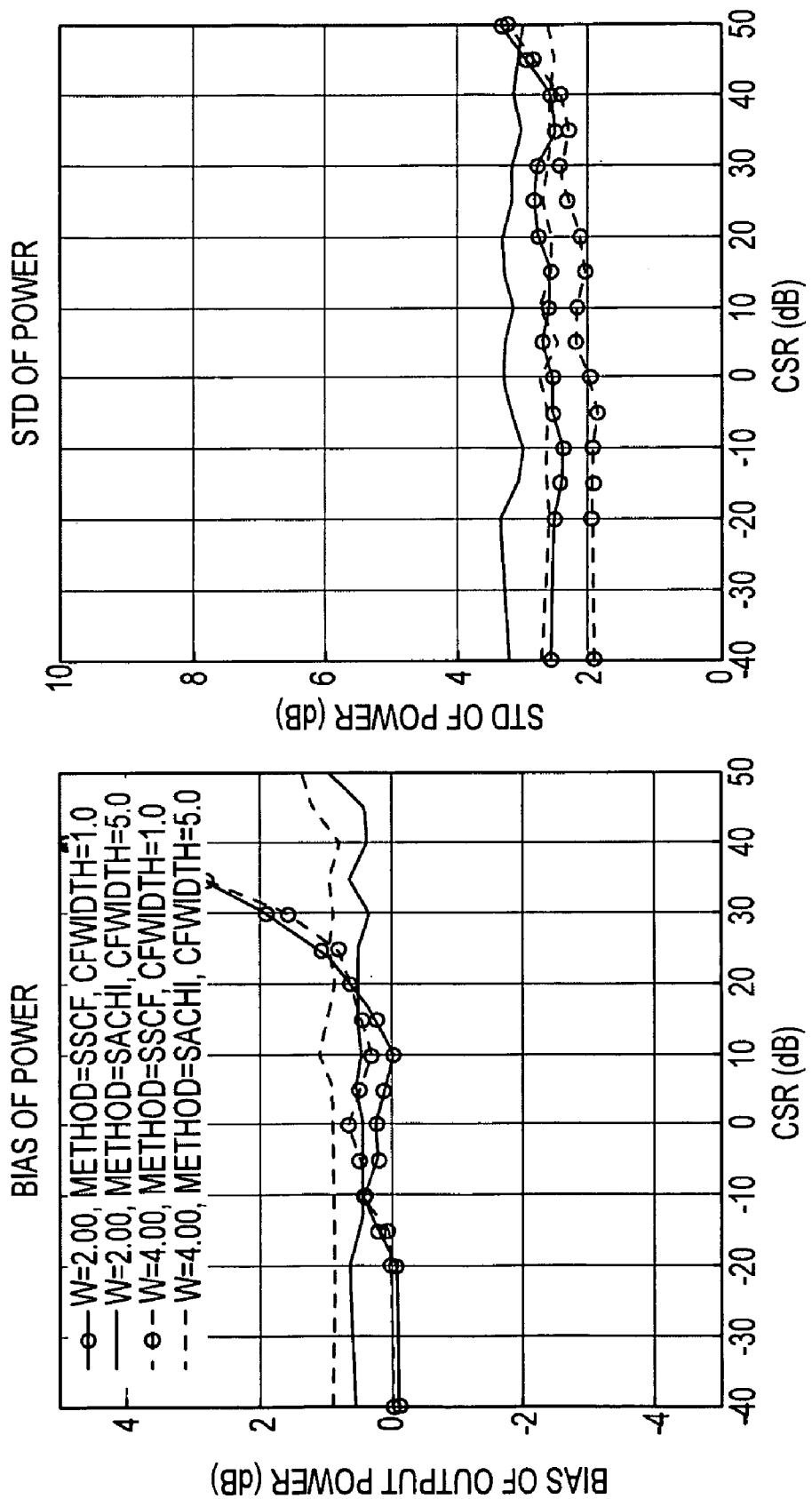
FIG. 8 shows the clutter suppression capabilities of the present invention compared to a prior art approach.

FIGS. 6-9 show a comparison of the clutter suppression capabilities of SACHI as well as the method according to the present invention. The left panel shows the bias of the output power (compared to the true weather power) and the right panel is the standard deviation of the estimate in dB; the x-axis in both plots is CSR. In FIG. 6, the SNR is 10 dB, PRT $T_1$ is 785 µs, M is 64, and the weather mean velocity is 13 m/s. In FIG. 7, the SNR is 10 db, PRT $T_1$ is 1000 µs, M is 64, and the weather mean velocity is 10 m/s. In FIG. 8, the SNR is 10 dB, PRT is 785 µs, M is 64, and the weather man velocity is 13 m/s. These plots show that for these cases, the method of the present invention performs comparable to the SACHI technique. For 64 points, the present invention performs better (less bias and lower standard deviation).

The inventors also compared the power and velocity recovery capabilities of SACHI and the method of the present invention as a function of the input weather velocity. FIG. 9a shows the bias of the output power (compared to the true weather power). FIG. 9b shows the standard deviation of the estimate in dB. FIG. 9c shows the (circular) mean bias of recovered velocity. FIG. 9d shows the standard deviation. For all of FIGS. 9a-9d, the SNR is 10 dB, PRT $T_1$ is 785 μs, M is 64, and the weather mean velocity varies across the Nyquist interval. These plots show that for these cases the method of the present invention performs comparable to the prior art approach. However, the method of the present invention is implemented much faster and simpler than the prior art SACHI approach. Furthermore, the method of the present invention requires no interpolation of the data signals received from the radar. The present invention also can be implemented and used with typical digital filtering techniques that previously were not available to staggered PRT data signals because of the unequal spacing between data samples. The present invention therefore provides an improved technique for clutter filtering PRT data signals.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other signal processing systems, and not just to the embodiments described above and shown in the accompanying figures. Accordingly, the scope of the invention should be determined from the following claims.

We claim:

1. A method for clutter filtering staggered pulse repetition time data signals, comprising the steps of:
   receiving a plurality of staggered pulse repetition time data signals, the data signals comprising one or more desired signals and one or more clutter signals;
   separating the staggered pulse repetition time data signals into a first separated data sequence and a second separated data sequence, wherein the first and second separated data sequences comprise equally spaced data samples; and
   filtering the one or more clutter signals from the first and second separated data sequences.

2. The method of claim 1, further comprising the step of recombining the filtered first and second separated data sequences to provide a filtered staggered pulse repetition time data sequence.

3. The method of claim 2, further comprising the step of generating a display of the filtered staggered pulse repetition time data sequence.

4. The method of claim 2, further comprising the step of storing the filtered staggered pulse repetition time data sequence in a storage system of a signal processor.

5. The method of claim 1, wherein the step of filtering the one or more clutter signals comprises using a digital filter in a signal processor.

6. The method of claim 1, wherein the step of filtering the one or more clutter signals comprises using a Gaussian Model Adaptive Processing clutter filter in a signal processor.

7. The method of claim 1, wherein the spacing between data samples comprises a first pulse repetition time pulse spacing $T_1$ plus a second pulse repetition time pulse spacing $T_2$.

8. The method of claim 1, further comprising the step of transforming the first and second separated data sequence from a time domain to a frequency domain prior to the step of filtering.

9. The method of claim 1, wherein the step of filtering the one or more clutter signals from the first and second separated data sequences comprises first determining which data signals comprise clutter signals and selectively filtering only the data signals that comprise clutter signals.

10. A signal processing system, comprising:
    a signal processor configured to:
    receive a plurality of staggered pulse repetition time data signals, the data signals comprising one or more desired signals and one or more clutter signals;
    separate the staggered pulse repetition time data signals into a first separated data sequence and a second separated data sequence, wherein the first and second separated data sequences comprise equally spaced data samples; and
    filter the one or more clutter signals from the first and second separated data sequences.

11. The signal processing system of claim 10, wherein the signal processor is further configured to recombine the filtered first and second separated data sequences to provide a filtered staggered pulse repetition time data sequence.

12. The signal processing system of claim 11, further comprising an interface configured to generate a display of the filtered staggered pulse repetition time data sequence.

13. The signal processing system of claim 11, further comprising a storage system configured to store the filtered staggered pulse repetition time data sequence.

14. The signal processing system of claim 10, wherein the one or more clutter signals are filtered using a digital filter in the signal processor.

15. The signal processing system of claim 10, wherein the one or more clutter signals are filtered using a Gaussian Model Adaptive Processing clutter filter in the signal processor.

16. The signal processing system of claim 10, wherein the spacing between data samples comprises the first pulse repetition time pulse $T_1$ plus the second pulse repetition time pulse $T_2$.

17. The signal processing system of claim 10, wherein the signal processor is further configured to transform the first and second separated data sequences from a time domain to a frequency domain prior to filtering.

18. The signal processing system of claim 10, wherein the signal processor is further configured to determine which data signals comprise clutter signals and selectively filter only the data signals that comprise clutter signals.

* * * * *